United States Patent [19]

Matsumoto et al.

[11] Patent Number: 5,774,584
[45] Date of Patent: Jun. 30, 1998

[54] METHOD AND APPARATUS FOR IDENTIFYING TABLE AREAS IN DOCUMENTS

[76] Inventors: Akihiro Matsumoto; Toru Niki; Tadanori Nakatsuka; Kazuyuki Saito, all c/o Canon Kabushiki Kaisha, 30-2, 3-chome, Shimomaruko, Ohta-ku, Tokyo, Japan

[21] Appl. No.: 685,779

[22] Filed: Jul. 24, 1996

Related U.S. Application Data

[63] Continuation of Ser. No. 175,755, Dec. 30, 1993, abandoned.

[30] Foreign Application Priority Data

Jan. 7, 1993 [JP] Japan .................................. 5-001229

[51] Int. Cl.$^6$ .............................. G06K 9/46; G06K 9/66
[52] U.S. Cl. ........................ 382/194; 382/193; 382/202
[58] Field of Search ................................... 382/181, 185, 382/186, 187, 190, 192, 193, 200, 271, 168, 171

[56] References Cited

U.S. PATENT DOCUMENTS

| | | |
|---|---|---|
| 4,688,088 | 8/1987 | Hamazaki et al. ...................... 382/18 |
| 4,903,312 | 2/1990 | Sato ........................................ 382/18 |
| 4,998,285 | 3/1991 | Suzuki et al. .......................... 382/18 |
| 5,073,953 | 12/1991 | Westdijk et al. ....................... 382/51 |
| 5,091,964 | 2/1992 | Shimomura ............................. 382/51 |
| 5,173,945 | 12/1992 | Pieters et al. .......................... 382/18 |
| 5,228,095 | 7/1993 | Abe ........................................ 382/18 |
| 5,280,544 | 1/1994 | Tanaka et al. .......................... 382/18 |
| 5,321,769 | 6/1994 | Takahashi et al. ..................... 382/18 |

*Primary Examiner*—Joseph Mancuso
*Assistant Examiner*—Gerard Del Rosso
*Attorney, Agent, or Firm*—Fitzpatrick, Cella, Harper & Scinto

[57] ABSTRACT

Image processing method and apparatus are provided. A histogram of image information is obtained. A peak position is detected from the histogram obtained. A small area is decided by using the detected peak position as a reference. A histogram of the decided small area of the image information is obtained. A specific point is determined from the peak position of the histogram of the small area obtained. The size of small area is decided in accordance with a peak width of the histogram of the image information. The image information is inputted by a scanner. A table can be used as image information and the specific point which is decided is an intersection of ruled lines of the table. A cell area of the table is judged from the intersection decided.

5 Claims, 14 Drawing Sheets

---- IMAGINARY FRAME

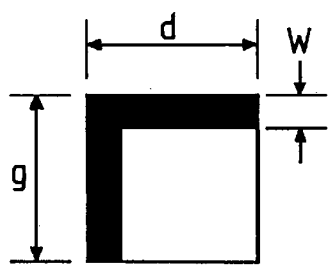
FIG. 9A
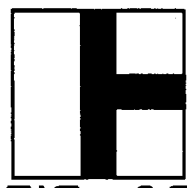
FIG. 9G
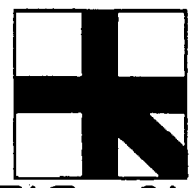
FIG. 9M
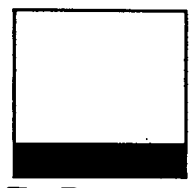
FIG. 9S
FIG. 9B
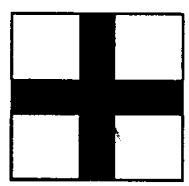
FIG. 9H
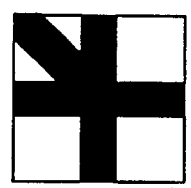
FIG. 9N
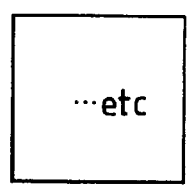
...etc
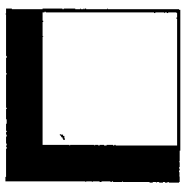
FIG. 9C
FIG. 9I
FIG. 9O
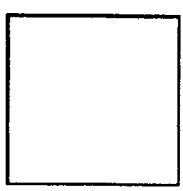
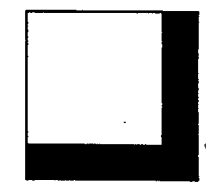
FIG. 9D
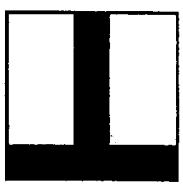
FIG. 9J
FIG. 9P
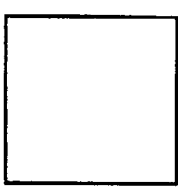
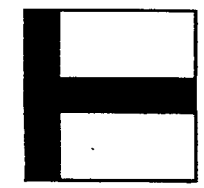
FIG. 9E
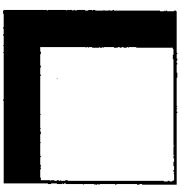
FIG. 9K
FIG. 9Q
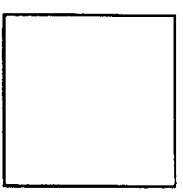
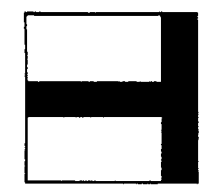
FIG. 9F
FIG. 9L
FIG. 9R
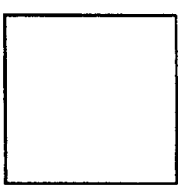

DICTIONARY PATTERN

EXTRACTED PATTERN

ONE INTERSECTION PATTERN IN THE TABLE

FIG. 12
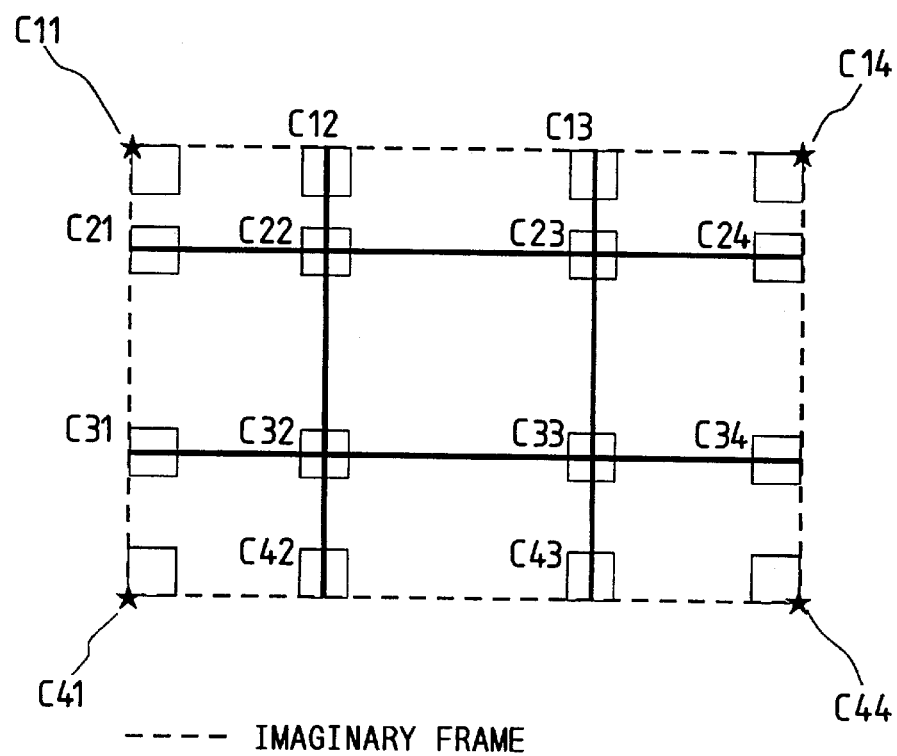
---- IMAGINARY FRAME
FIG. 13A    FIG. 13B    FIG. 13C    FIG. 13D
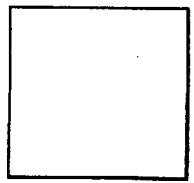 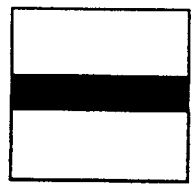 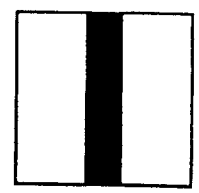 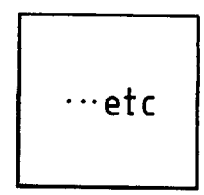

DICTIONARY PATTERN

NORMALIZATION

METHOD AND APPARATUS FOR IDENTIFYING TABLE AREAS IN DOCUMENTS

This application is a continuation of application Ser. No. 08/175,755 filed Dec. 30, 1993, now abandoned.

BACKGROUND OF THE INVENTION

1. Field of the Invention

The present invention relates to an image processing method and apparatus which can identify ruled lines which construct a table from image data of a table area and can also discriminate a cell area.

2. Related Background Art

Hitherto, in order to identify ruled lines of a table having an irregular construction from inputted image data and to decide a cell area, irregularity could not be recognized by histograms obtained in both the horizontal and vertical directions from a whole table area. Hence, continuity of the ruled lines is found by tracing an outline, whereby a connecting state of the ruled lines is judged and an intersection is identified.

The conventional technique mentioned above requires a long processing time and, when a part of the ruled lines of the table in an original image is blurred, continuity of the ruled lines in such a portion is lost. Also, there is a problem when a cell area in the table cannot correctly be determined by the outline tracing.

SUMMARY OF THE INVENTION

In the present invention, an intersection can be correctly detected from a table having an irregular construction by obtaining a histogram of a small area and by identifying the intersection.

According to the present invention, since an intersection of the table is discriminated by the histogram, processing time can be reduced. Further, after the histogram of a whole table area is obtained, the position of the small area histogram is determined. Therefore, an irrelevant small area is not used as a target for identification and processing time can be reduced.

Moreover, since the intersection is detected by obtaining, at two stages, the large and small area histograms, construction of the table can be identified even when image data is blurred.

BRIEF DESCRIPTION OF THE DRAWINGS

FIGS. 9A to 9S are diagrams showing examples of an intersection pattern dictionary to be formed;

FIG. 12 is a diagram showing an example in which an imaginary frame is attached to the deformed table;

FIGS. 13A to 13D are diagrams showing examples of intersection patterns to which dictionaries should be added for deformed tables;

DETAILED DESCRIPTION OF THE PREFERRED EMBODIMENTS

Embodiments of the invention will be explained in detail hereinbelow with reference to the drawings.

Figure 1:
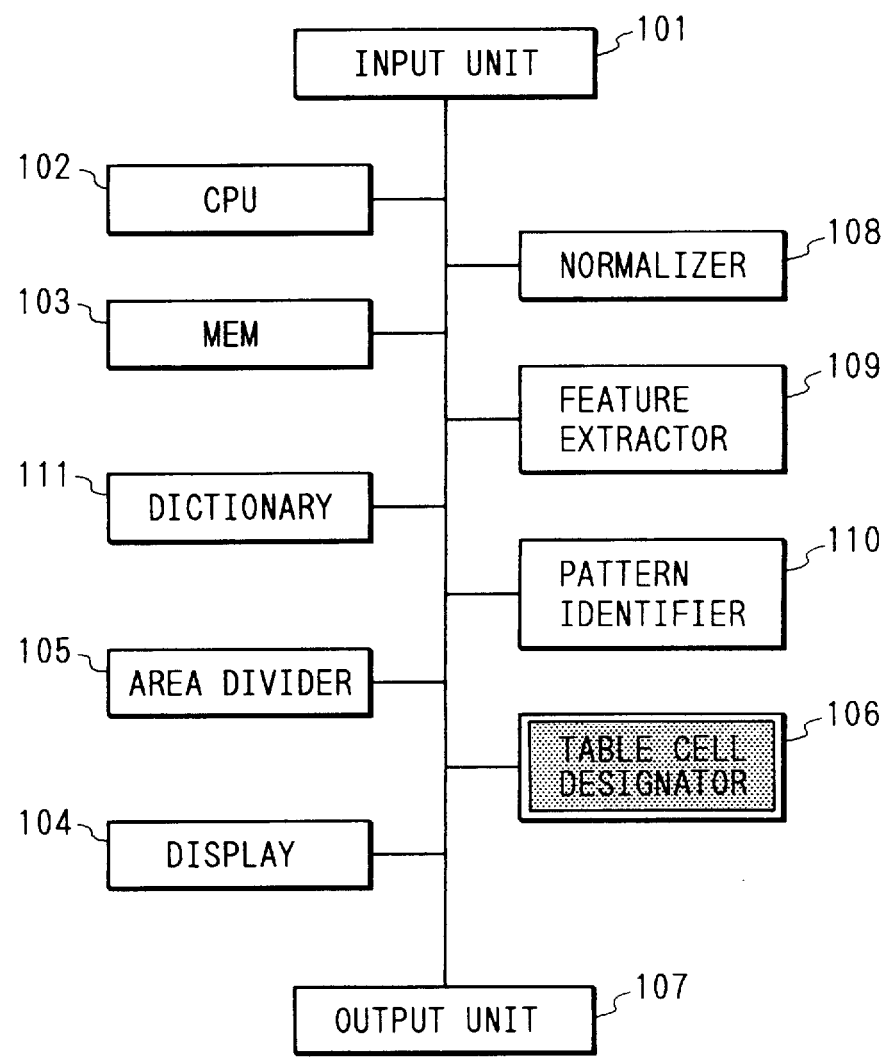
FIG. 1 is a block constructional diagram of an image processing apparatus of an embodiment.

FIG. 1 shows a schematic construction of an image processing apparatus of an embodiment of the invention. In FIG. 1, reference numeral 101 denotes an input unit of image data; 102 denotes an arithmetic operation processing unit (CPU) which performs an arithmetic operation on processes of each unit in accordance with a control program stored in a memory unit 103; and 103 denotes the memory unit (MEM) which stores various kinds of data such as control programs of flowcharts (described hereinafter) and intersection pattern forming information (explained hereinlater). The memory unit 103 includes a ROM and a RAM.

Reference numeral 107 denotes an output unit which outputs the result of the arithmetic operating process, the result of the image process, and image data and which executes transmission to a host computer for printing by a printer. Reference numeral 104 denotes a display, for example, a CRT to display the data; 105 denotes an area divider which analyzes image data inputted from the input unit 101 and executes a whole area dividing process for detecting an area in which character, table, or diagram exists; and 106 denotes a table cell designator to designate a cell area in a table extracted by the area divider 105.

Reference numeral 108 denotes a normalizer for making uniform the size of the intersection pattern for extracting an intersection portion of the table from the image data; and 109 denotes a feature extractor to extract a feature vector from the image pattern of the extracted intersection pattern. Reference numeral 110 denotes a pattern identifier which calculates a distance between the feature vector obtained from the image pattern inputted by the input unit 101 and a study vector stored in the dictionary and which identifies the inputted image pattern. Reference numeral 111 denotes a dictionary which stores various dictionaries of study vectors and the like to be calculated by the pattern identifier 110.

Designation of a Cell Area by a Small Scale Histogram

Figure 2:
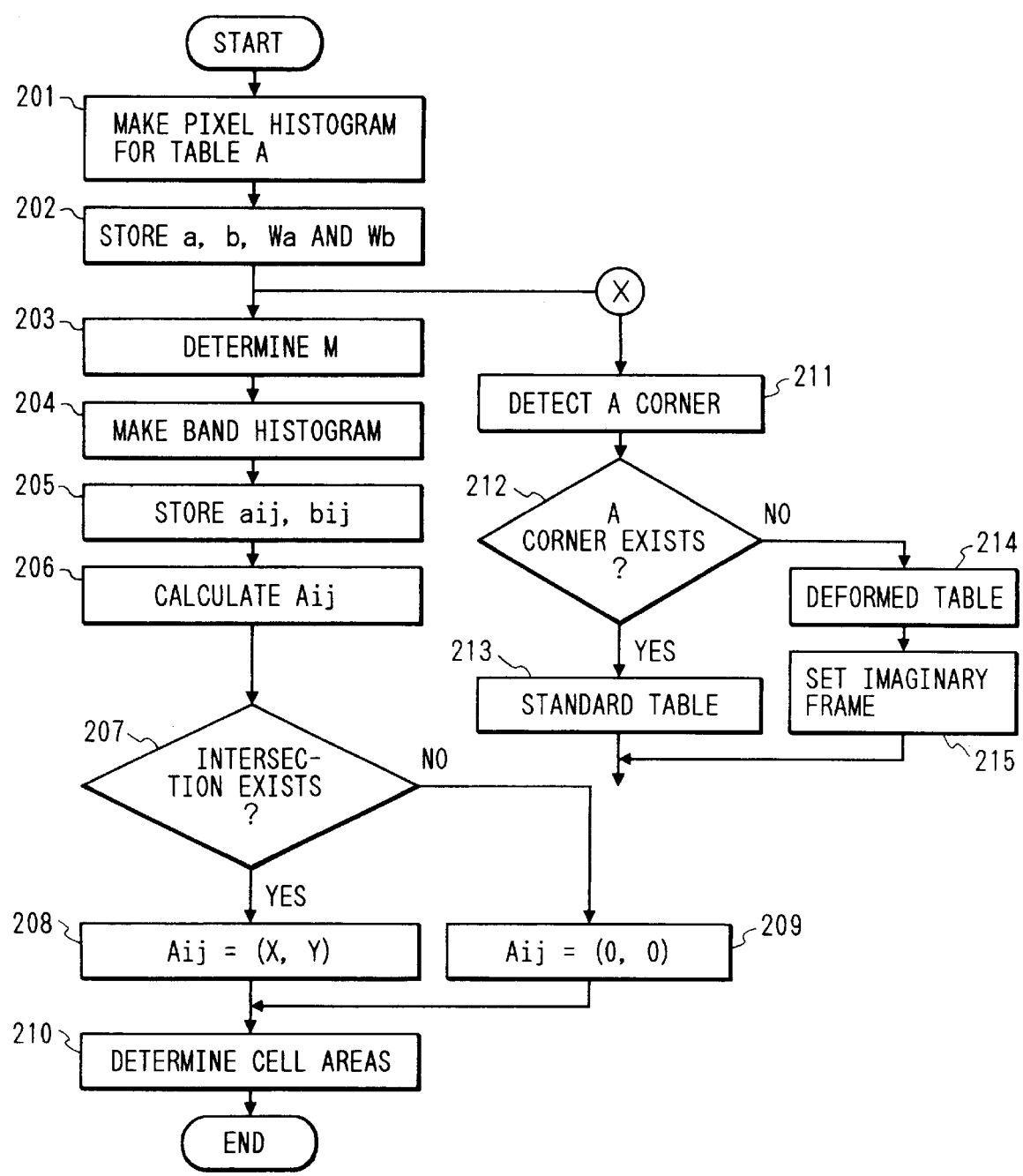
FIG. 2 is a first flowchart showing a processing procedure of the operation of the embodiment.

The process for designating a cell area using a small scale histogram by the table cell designator is shown in the flowchart of FIG. 2.

Figure 3:
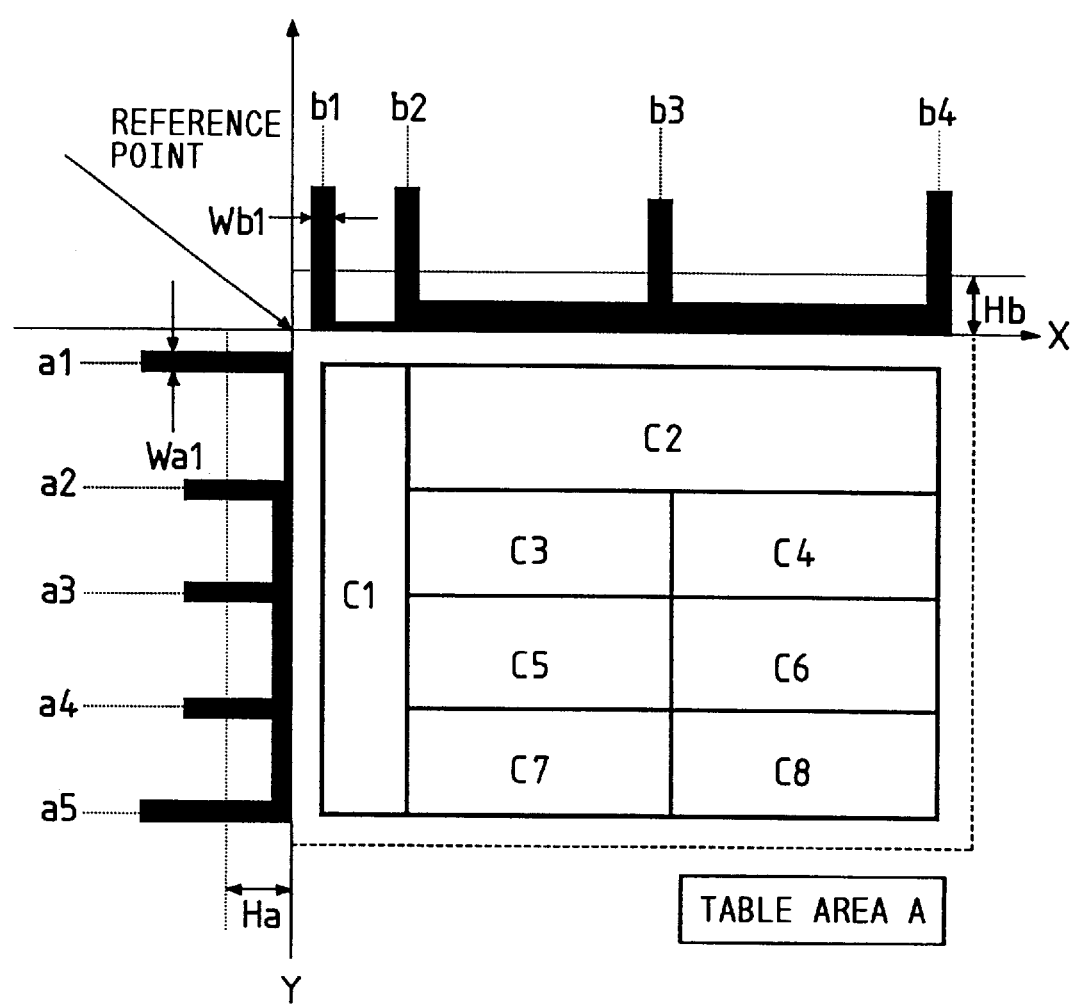
FIG. 3 is a diagram showing an example in which histograms are obtained in both the horizontal and vertical directions for a certain table area.

A table area A, shown by a broken line in FIG. 3, is an area judged to be an area in which a table image exists by the area divider provided in the image processing apparatus. In FIG. 3, a histogram of pixels is obtained within a range of the table area A by using one point in area A as a reference point (step 201). Reference numeral 301 schematically shows a histogram in the horizontal direction and 302 schematically shows a histogram in the vertical direction. In the histograms, it is assumed that, for example, (m) peaks equal to or larger than a threshold value Ha of the height determined in the horizontal direction appear in the horizontal direction; and (n) peaks equal to or larger than a threshold value Hb of the height determined in the vertical direction appear in the vertical direction. On the above assumption, peak position coordinates a ($a_1, a_2, \ldots, a_m$) and b ($b_1, b_2, \ldots, b_n$) of the above peaks, and peak widths Wa and Wb, determined by the averages of the peak widths, are stored in the memory unit 103 (step 202) as peak data.

When the peak positions are located at regular intervals and have the same height in each of the horizontal and vertical directions, intersections of the ruled lines in the table can be obtained by calculations. However, in general, a number of tables having irregular constructions as shown in FIG. 3 exist. A cell area Cl in the table is the cell area which was divided into four regions in the vertical direction for determining the intersections of the peaks in the horizontal and vertical directions. Therefore, the correct cell area cannot be determined.

Figure 4:
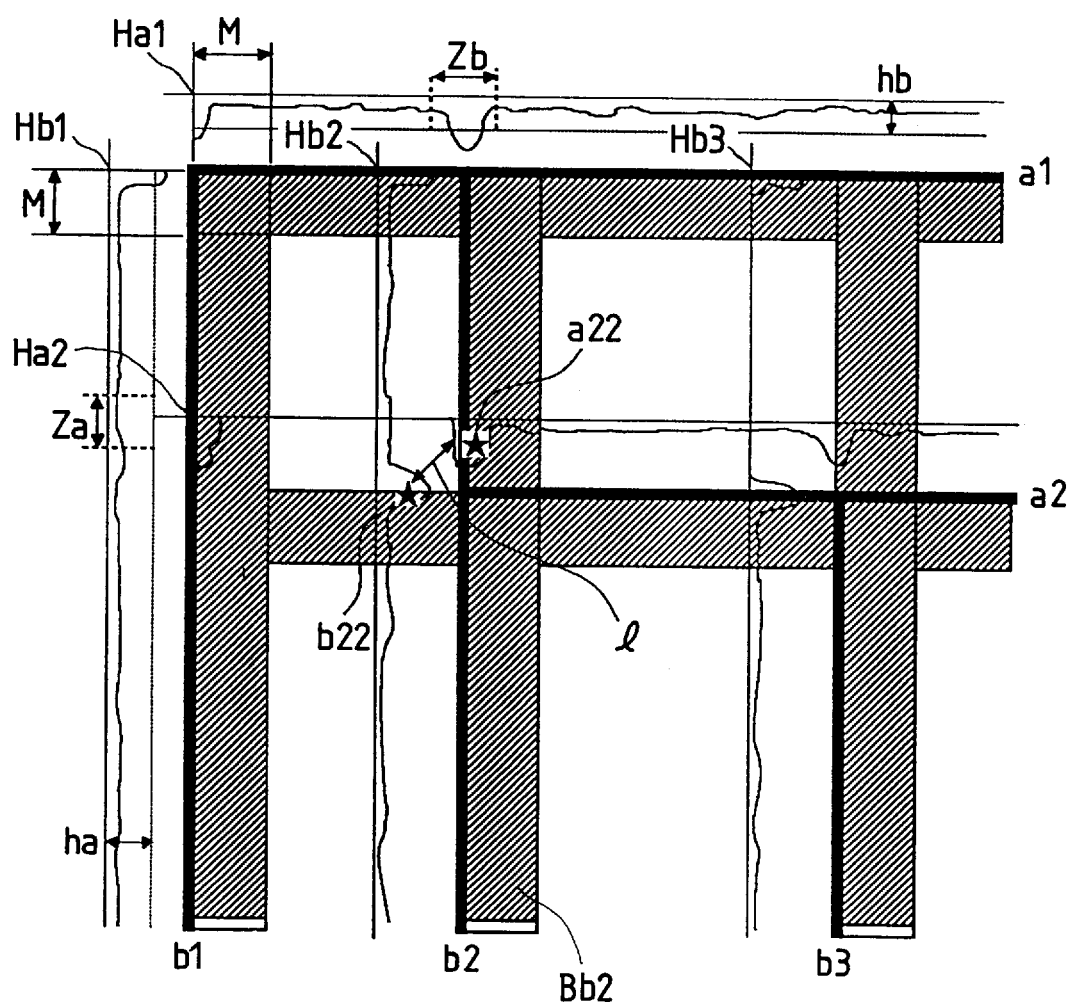
FIG. 4 is a diagram showing an example in which intersection coordinates are obtained from peak position coordinates in a small scale histogram.

First, the average of the peak widths Wa and Wb obtained in FIG. 3 is calculated, thereby obtaining an average line width W (step 203). A value M is determined by adding a certain value to the obtained average line width W. Since M>W, the value of M can be determined by the ratio with W, or it can be set to exceed the maximum width in consideration of values of $Wa_1$ to $Wa_m$ and values of $Wb_1$ to $Wb_n$, or it can be determined by adding a predetermined value. As shown in FIG. 4, the peak position coordinates a and b in the horizontal and vertical directions, stored in the memory unit 103, are used as references and image data is extracted in a band shape having a width of M (M>W) dots, thereby forming partial histograms of pixels in the horizontal and vertical directions (step 204).

In FIG. 4, the peak position coordinates a and b stored in the memory unit 103 have been set as references, and the band area having the width of M dots has been determined in the positive direction from the reference point of table area A. However, the invention is not limited to the above method. The width of M dots can be also set in the negative direction. The band area with respect to the peak position coordinates a and b as centers can be also determined, so that even when a construction of the table is not clear intersections can be accurately detected.

A histogram of pixels in the band area determined as mentioned above is obtained. For instance, in FIG. 4, a histogram in a band area determined by using the peak position coordinates $b_2$ as a reference, namely, a band $Bb_2$ (band area of a hatched pattern) is a histogram $Hb_2$. In FIG. 4, in order to avoid complication of the diagram, a reference line position of the histogram is shown by deviating from the peak position coordinates.

From the peak positions ($Ya_1, Ya_2, \ldots, Ya_m$) detected by the histogram $Hb_2$ and the position ($b_2$) of the reference line of the histogram $Hb_2$, intersections detected by the histogram are set to $b_{12}$ ($b_2$, $Ya_1$), $b_{22}$ ($b_2$, $Ya_2$), ... and $Y_{m2}$ ($b_2$, $Ya_m$) (step 205). Intersections are detected in each small scale area by setting the peak position coordinates a ($a_1, a_2,$ ... $a_m$) and b ($b_1, b_2, \ldots, b_n$) as references and are stored in the memory unit 103. When obtaining such intersections, it is also possible to predetermine areas $Z_a$ and $Z_b$ of intersection coordinates predicted from the peak position coordinates a and b or threshold values $h_a$ and $h_b$ of proper heights in the small area histogram and to obtain intersections $a_{ij}$ and $b_{ij}$ within those ranges. Subsequently, with respect to the intersections in which the combinations of suffixes i and j are equal (in FIG. 4, $a_{22}$ and $b_{22}$), a distance I 5 between them is calculated. When the distance I is smaller than a predetermined threshold value L (>0), namely, when $$0 < I < L$$

it is considered that $a_{ij} = b_{ij}$. The average position $A_{ij}$ ((Xa+Xb)/2, (Ya+Yb)/2) is decided as intersection coordinates in the table (step 206). In this instance, a check is made to see if the peak positions exist in both of the areas (whether the position coordinates ≠0) or not (step 207). For the area in which no peak position (position coordinates =0) exists in one of the two areas, there is no intersection. Therefore, 0 is substituted to $A_{ij}$ (step 209). For the area having an intersection, $A_{ij}$ (X, Y) is stored in the memory unit 103 (step 208).

Figure 5:
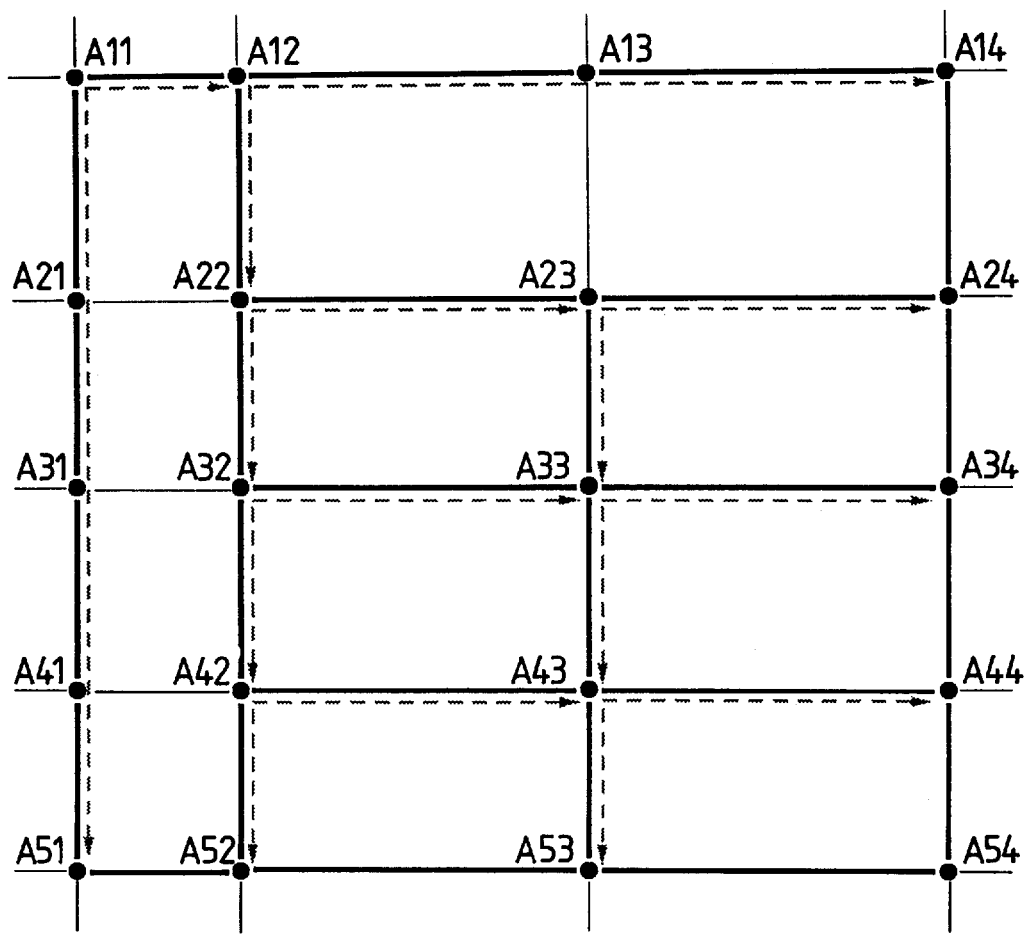
FIG. 5 is a diagram of a procedure in which a cell area is designated from the obtained intersection coordinates.

FIG. 5 shows examples of the intersection coordinates A11 to A54 obtained as mentioned above. The obtained intersection coordinates are stored in the memory unit 103 as data of the table area A. Subsequently, the small number in the column in the obtained intersection coordinates $A_{ij}$ is used as a reference, as shown in FIG. 5. Adjacent points in the horizontal and vertical directions, for example, the smallest A11 in the first column, are A12 and A51. (Since points A21 to A41 have no intersection and thus are stored as 0, they are ignored.) Therefore, a rectangle surrounded by the intersections A11, A12, and A51 is set to one cell area C1 in the table. Since A51 of the first column indicates the final point, the cell area is determined by setting the area surrounded by A14 and A22 as cell area C2, using A12 of the second column as a reference. The area surrounded by A23 and A32 is set as cell area C3, ... (step 210). These cell areas are stored in the memory unit 103 along with the intersection coordinate data and the cell numbers.

Figure 6A:
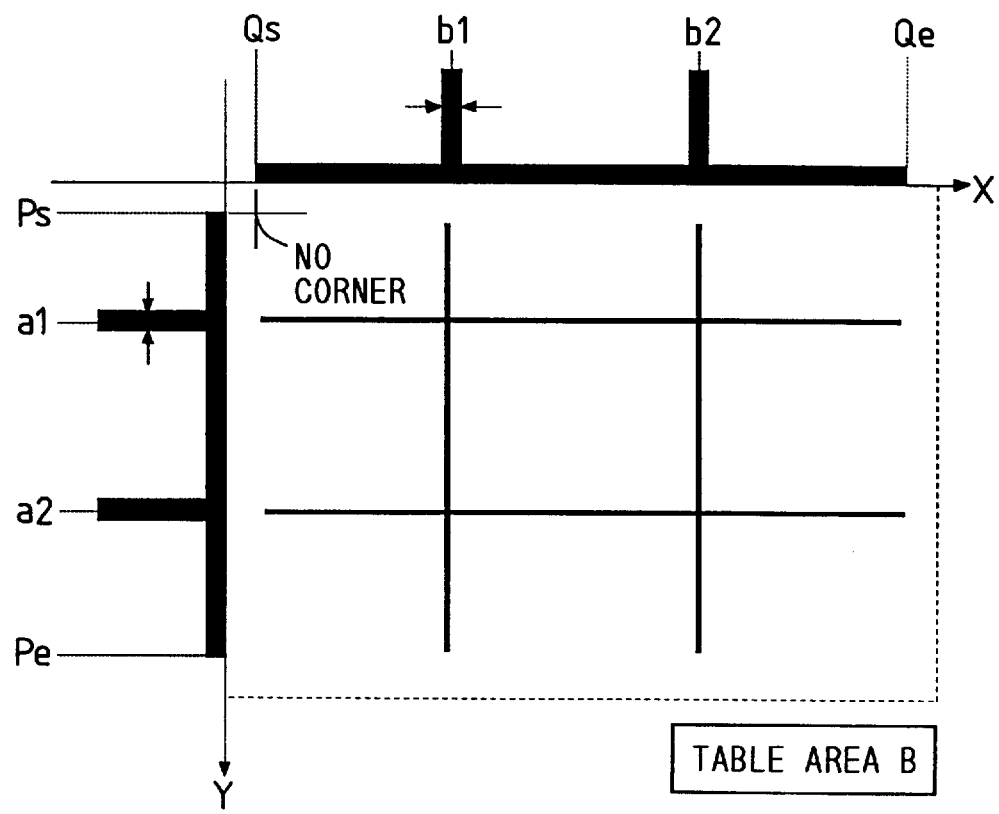
FIGS. 6A and 6B are diagrams showing examples of deformed tables.
Figure 6B:
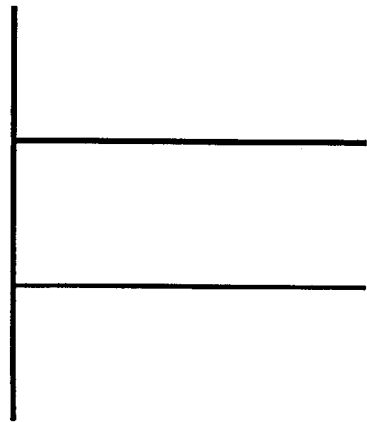

Processes with respect to tables which are not closed as shown in FIGS. 6A and 6B, will now be described.

In an actual document image, not only the closed table shown in FIG. 3 but also many deformed tables exist. Typical examples are shown in FIGS. 6A and 6B.

In FIG. 6A, histograms are obtained by projecting in the horizontal and vertical directions for a table area B. Coordinates and widths of peaks are obtained as ($a_1$, $Wa_1$), ($a_2$, $Wa_2$), ($a_3$, $Wa_3$), ... in the vertical direction and as ($b_1$, $Wb_1$), ($b_2$, $Wb_2$), ($b_3$, $Wb_3$) ... in the horizontal direction in a manner similar to the processes of the table in FIG. 3 (steps 201 and 202). A distance S between the first peak positions $a_1$ and $b_1$ in each of the horizontal and vertical directions is calculated. When the resultant value is smaller than a threshold value S (>0), it is regarded that the peak positions $a_1$ and $b_1$ are the same point. That is, at that time point, it is determined that there is a corner in the table. If there is no corner in the table, it is determined that the table is deformed. To judge more precisely, it is necessary to check for the presence or absence of a corner at all four corners (steps 211 and 212).

Figure 7:
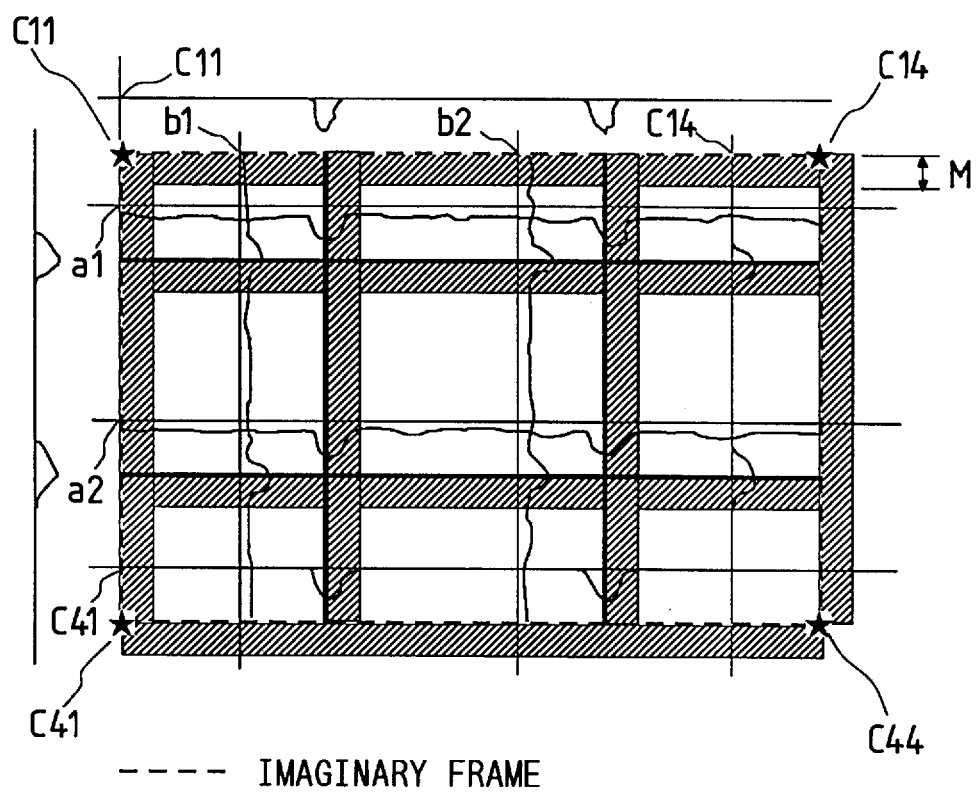
FIG. 7 is a diagram showing an example in which intersection coordinates are obtained by providing an imaginary frame for the deformed table.

When it is determined that the table is deformed (step 214), corners C11, C14, C41, and C44 are obtained from the start points and final points (Ps, Pe, Qs, and Qe in FIG. 6A)

of the histograms in the vertical and horizontal directions as shown in FIG. 7 and an imaginary frame as shown by a broken line is set (step 215). Then, in a manner similar to the above embodiment, C11, a12, a13, and C14 are used as references in the horizontal direction, and C11, b21, b31, and C41 are used as references in the vertical direction. Each histogram is obtained as a band having a proper width M calculated from the line width, and average intersection coordinates $C_{ij}$ are obtained. In the case of a deformed table, C1 to C44 are used as coordinates of the corner and, when a partner for obtaining the average does not exist at a point of the outer frame, a1 or b1 is substituted as an average intersection. In a manner similar to that mentioned above, the range surrounded by neighboring points in the horizontal and vertical directions is sequentially determined as a cell area in accordance with the small column from C11.

Figure 8:
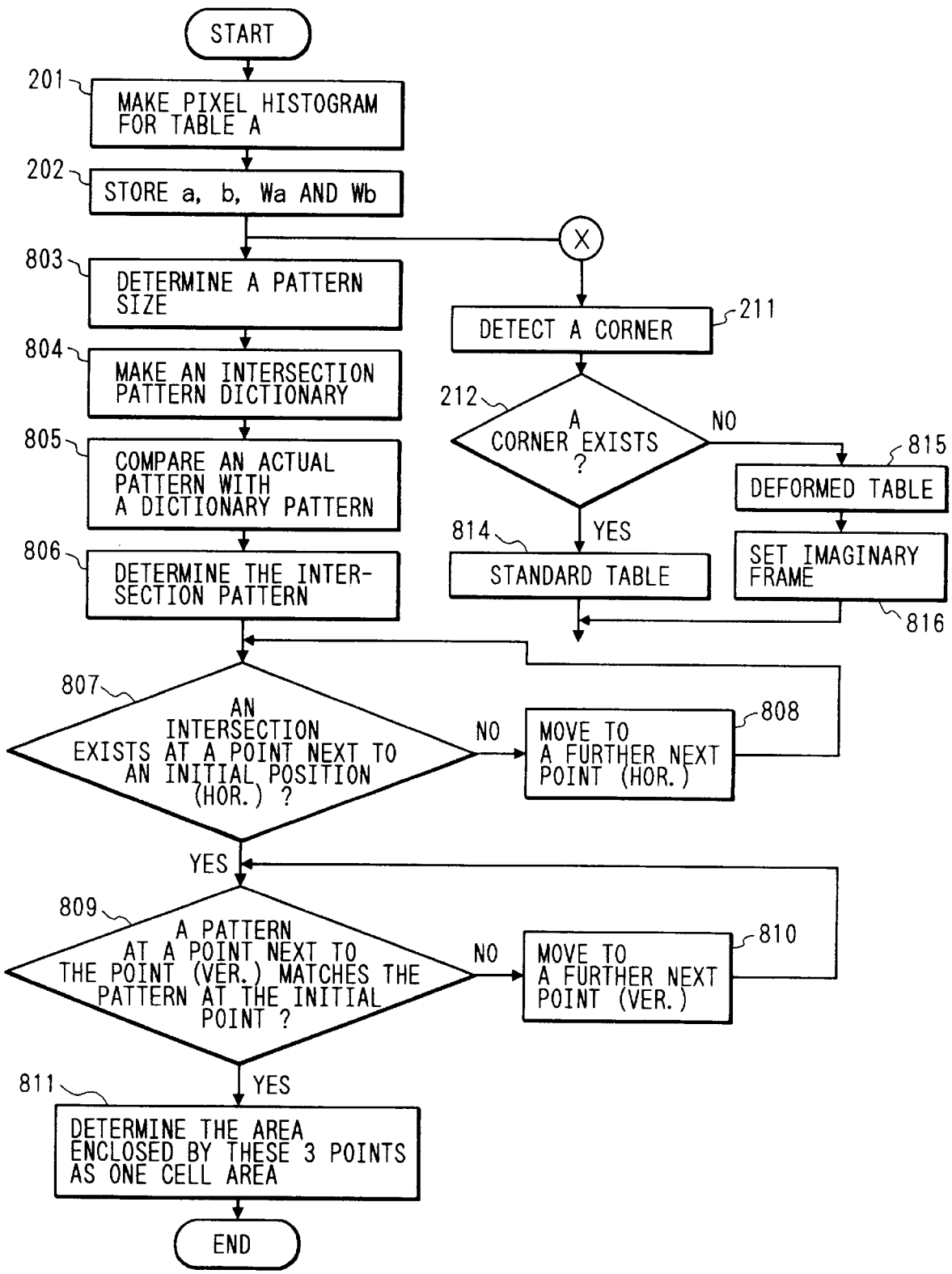
FIG. 8 is a second flowchart showing a processing procedure of the operation of the embodiment.

Designation of the Cell Area by Comparing the Pattern Extracted from the Intersection with the Dictionary FIG. 8 shows a flowchart of the processes for designating a cell area by extracting the pattern from the intersection by the table cell designator 106 and comparing it with the dictionary.

Figure 10A:
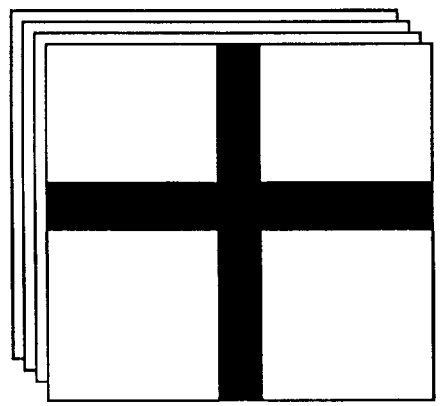
FIGS. 10A to 10C are diagrams showing a first example of an intersection pattern dictionary and an intersection pattern extracted from an original image.
Figure 10B:
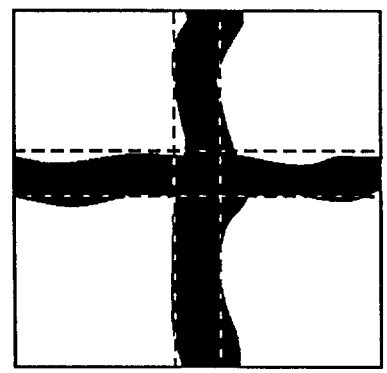
Figure 10C:
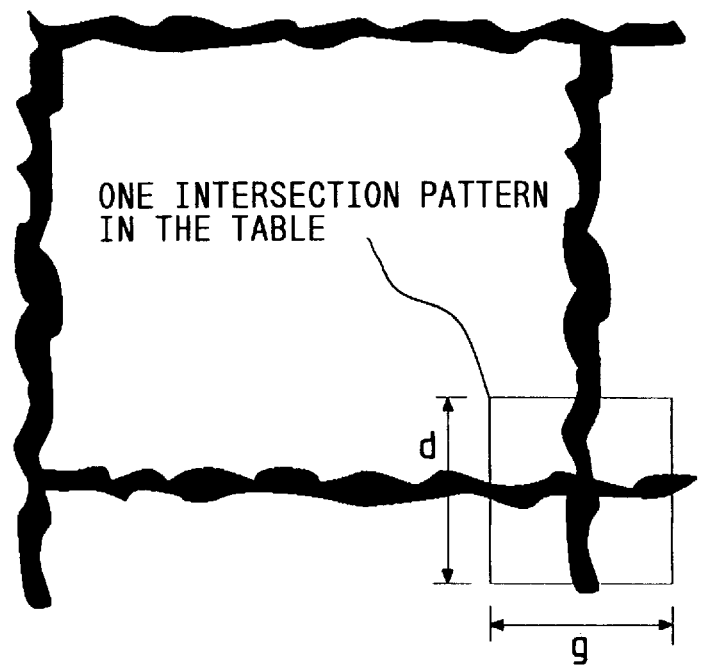

Generally, in a table constructed of horizontal, vertical, and diagonal lines, the number of kinds of intersection patterns are limited. The size of a pattern extracted at the intersection is determined on the basis of the obtained average line width W (803). As shown in FIGS. 9A to 9S, several intersection patterns are formed at a size of d×g dots with respect to the intersection pattern forming information stored in the intersection pattern dictionary in the memory unit 103 (804). Subsequently, the intersection coordinates positions $C_{ij}$ (i=1, 2, 3, . . . as row, j=1, 2, 3, . . . as column; refer to FIG. 11) predicted by the peak positions a and b in the horizontal and vertical directions stored in the memory unit 103 are calculated. The obtained intersections are used as reference points and the intersection pattern of d×g dots is extracted from the image data and compared with the intersection pattern dictionary (in step 805). Specifically, as shown in FIGS. 10A to 10C, the inclusive OR is obtained for like positions of the intersection pattern dictionary (FIG. 10A) and the actual intersection pattern (FIG. 10B). The number of total dots is divided by the number of black pixels which finally remain in d×g dots, thereby obtaining an overlap degree D. That is, $$\text{Overlap degree } D = \frac{\text{the number of all dots } (d \times g)}{\text{the number of remaining black pixels}}$$

For one intersection pattern, a comparison is made with the dictionary patterns and the pattern of largest overlap degree is set to the intersection pattern (806). The cell area in the table is now determined by using the intersection coordinates and the intersection pattern determined so far.

First, the intersection pattern of the neighboring points in the horizontal direction is sequentially observed using the small column as a reference (807). When the pattern actually has an intersection, the point is used as a reference and the neighboring points in the vertical direction are subsequently observed. (The pattern having the intersection is shown in FIGS. 9A to 9P.) A check is made to determine whether or not the intersection pattern at the point corresponding to the diagonal point, when it is seen from the first point, can be the intersection pattern at the diagonal point of the intersection pattern at the initial point (809). That is, when the intersection pattern at the initial point is determined, the diagonal pattern on the diagonal line is unconditionally determined. For example, the pattern of FIG. 9F can exist as a diagonal pattern for FIG. 9A; however, the pattern of FIG. 9E cannot. Such information is stored in the memory unit and judged.

An actual example will now be explained with reference to FIG. 11. First, the intersection pattern of point C12 in the horizontal direction is observed using C11 as a reference. From such an intersection pattern, neighboring point C22 in the vertical direction is seen. Since this can be the intersection pattern at the initial point C11, the area enclosed by C11, C12, and C22 is set to one cell area (811). Subsequently, adjacent point C22 in the horizontal direction is seen using C21 as a reference. Since it includes the intersection, adjacent point C32 in the vertical direction is seen. However, since C32 cannot be the intersection pattern on the diagonal line of initial point C21, point C32 is ignored and point C42 follows (810). Since the pattern at this point can be the intersection pattern for C21, the area enclosed by C21, C22, and C42 is set to one cell area.

Thus far, the processes have been executed up to the final fourth row. Therefore, C12 of the second column will be subsequently used as a reference. No intersection is included in the intersection pattern of adjacent point C13 in the horizontal direction for C12 (808), so point C13 is ignored and the process advances to the next point C14. Since an intersection is included in point C14, adjacent point C24 in the vertical direction from point C14 is seen. Since point C24 can be an intersection pattern on the diagonal line of C12, the area enclosed by C12, C14, and C22 is set to a cell area. In a manner similar to the above method, the area enclosed by C22, C23 and C33, the area enclosed by C32, C33, and C43, etc. are sequentially designated as cell areas. The cell areas determined as mentioned above are stored in the memory unit 103 with the intersection coordinates data and the sequentially determined cell management numbers.

Processes for obtaining the cell areas in deformed tables as shown in FIGS. 6A and 6B will now be described. In FIG. 7, histograms are first formed by projecting in the horizontal and vertical directions for table area B and the coordinates and widths of the peaks are obtained as $(a_1, Wa_1)$, $(a_2, Wa_2)$, $(a_{31}, Wa_3)$, . . . in the vertical direction and $(b_1, Wb_1)$, $(b_2, Wb_2)$, $(b_3, Wb_3)$, . . . in the horizontal direction in a manner similar to that mentioned above (201, 202). The distance a between the first peak positions $a_1$ and $b_1$ is calculated. When the value of S is equal to or less than the threshold value S (>0), it is regarded that those positions are located at the same point. That is, it is judged such that there is a corner in this table. If no corner exists in this table, it is judged that the table is a deformed table. When judging more precisely, it will be understood that it is necessary to discriminate the presence or absence of four corners (811, 812).

By checking the corners in a manner similar to the processing steps (211, 212) in the flowchart of FIG. 2, when the table is deformed (214), the corners C11, C14, C41, and C44 are obtained as shown in FIG. 12 from the initial and end points (Ps, Pe, Qs, Qe in FIG. 6A) of the histograms in the vertical and horizontal directions. An imaginary frame as shown by broken lines is set (816). Then, in a manner similar to the foregoing embodiment, C11, $a_1$, $a_1$, and C14 are used as references in the horizontal direction, C11, $b_1$, $b_1$, and C41 are used as references in the vertical direction, and the position of the intersection coordinates is obtained by the calculations. The pattern of d×g dots while setting the points as centers is compared with the intersection pattern dictionaries, thereby finding the actual intersection pattern. On the basis of the actual intersection pattern, the cell area in the table is designated. In order to designate the cell areas in the table while also including the deformed tables as shown in FIGS. 6A and 6B, intersection patterns as shown in FIGS. 13A to 13D must be further formed and added to the intersection pattern dictionary.

Processes for Normalizing a Pattern Extracted From the Intersection

Figure 14:
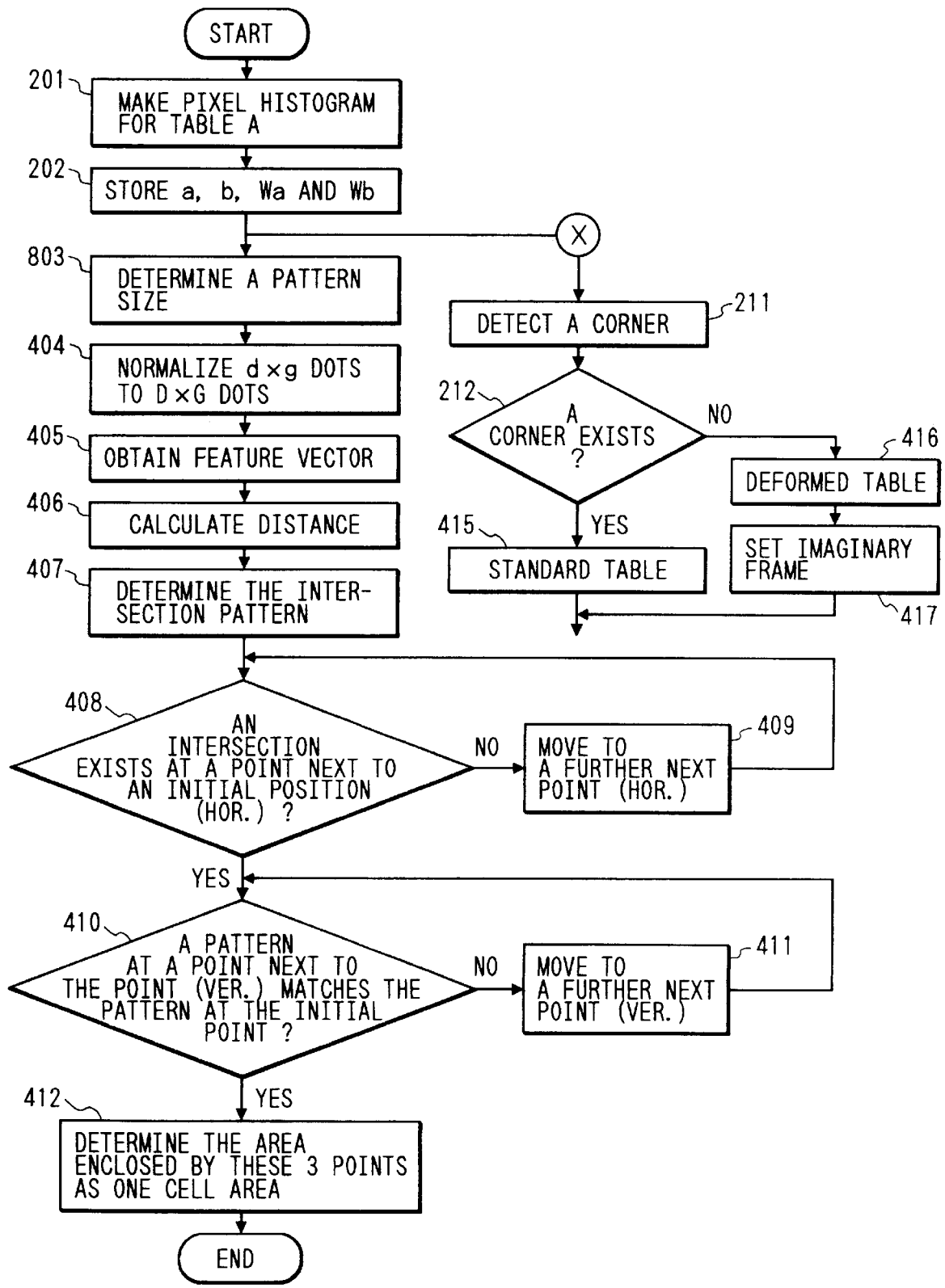
FIG. 14 is a third flowchart showing a processing procedure of the operation of the embodiment.
Figure 15A:
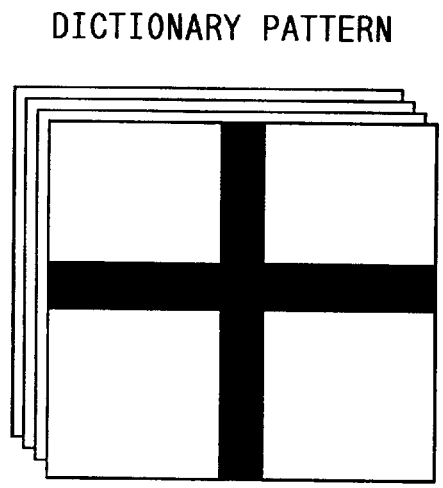
FIGS. 15A to 15C are diagrams showing a second example of an intersection pattern dictionary and a normalized intersection pattern extracted from the original image.
Figure 15B:
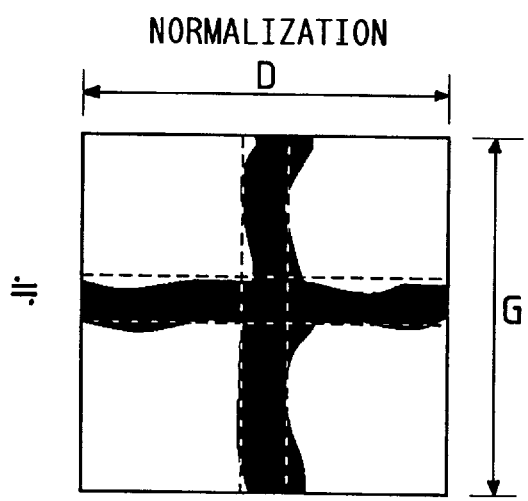
Figure 15C:
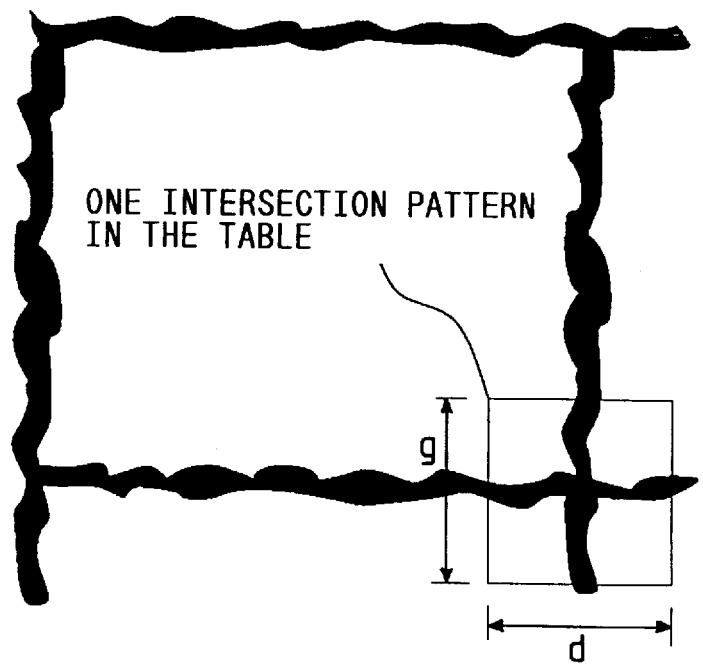

The procedure for normalizing the pattern extracted from the intersections by the table cell designator 106 will be explained with reference to the flowchart of FIG. 14.

Figure 11:
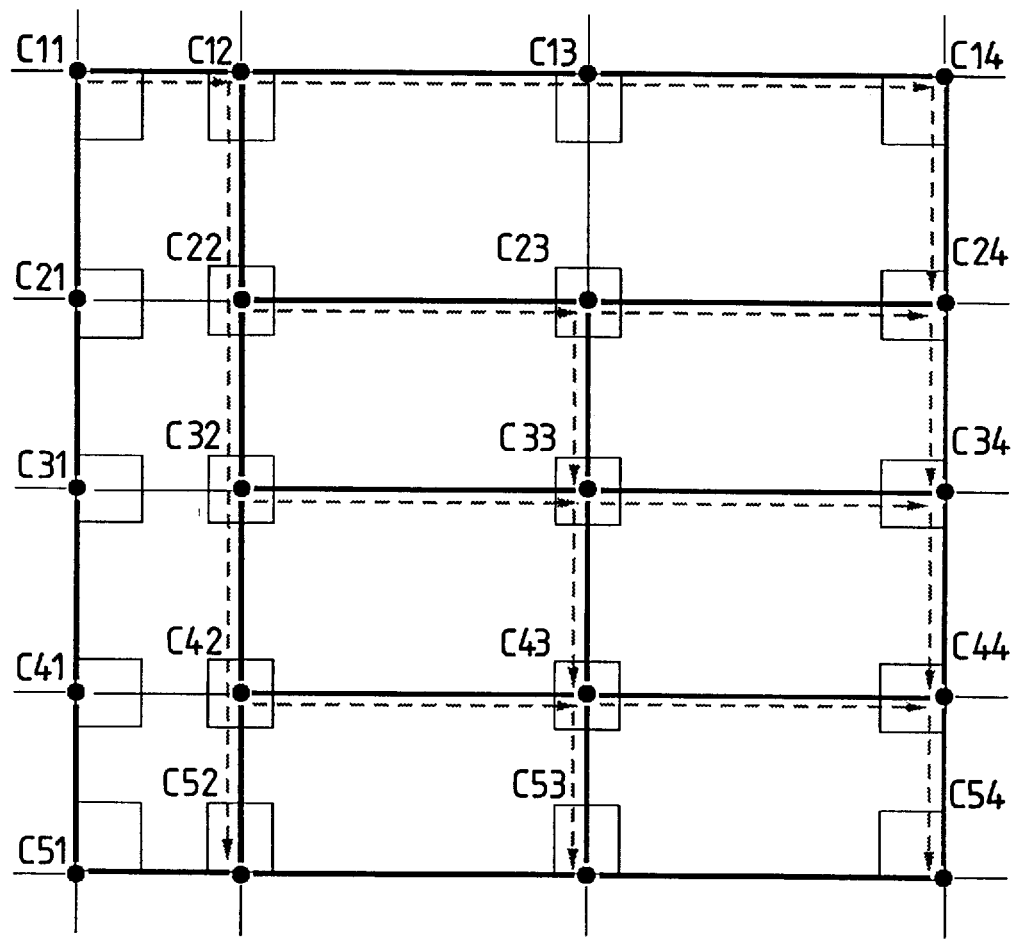
FIG. 11 is a diagram of a procedure in which a cell area is designated from the intersection coordinates included in the obtained intersection pattern.

The intersection coordinates positions $C_{ij}$ (i=1, 2, 3, ... as a row, j=1, 2, 3, ... as a column; refer to FIG. 11) predicted by the peak positions a and b in the horizontal and vertical directions are calculated. The intersection is used as a reference point and the intersection pattern of d×g dots is extracted. To compare the extracted intersection pattern with the dictionary, d×g dots are normalized to the size of D×G dots by the normalizer 108 (404). Subsequently, a feature vector is obtained by the feature extractor 109 (405). Various kinds of well-known methods have been proposed as a feature extracting method. In this case, a method is used whereby a direction index histogram in the N direction is obtained for the outline of an original image extracted and this is used as a feature vector. Finally, the distances between the above feature vector and the feature vectors in the intersection pattern dictionary are calculated by the pattern identifier 110. The smallest distance is determined as an intersection pattern of the point (406 to 407). The following equation is used to calculate the distances.

$$d = \Sigma(X_i - M_i)^2$$

n: the number of dimensions $X_i$: input vector $M_i$: study vector

A method of obtaining cell areas by using the intersection coordinates $C_{ij}$ and the obtained intersection patterns will now be described. First, the column is used as a reference and intersection patterns of the neighboring points in the horizontal direction are seen in accordance with the order from the small column (408). When the pattern has an intersection, the point is used as a reference and the neighboring point in the vertical direction is seen. (The pattern having the intersection denotes a pattern on which an intersection actually exists, as shown in FIGS. 9A to 9P.) A check is made to determine whether or not the intersection pattern at this point, corresponding to the diagonal point as seen from the first point, can be the intersection pattern at the diagonal point of the intersection pattern at the initial point. That is, when the intersection pattern at the initial point is determined, the intersection pattern on the diagonal line is unconditionally limited. For instance, although the pattern of FIG. 9F can exist as a diagonal pattern for the pattern of FIG. 9A, the pattern of FIG. 9E cannot so exist. Such information is stored in the intersection pattern dictionary and judged.

An actual example will now be described with reference to FIG. 11. First, the intersection pattern of point C12, neighboring in the horizontal direction, is seen using C11 as a reference. Since such an intersection pattern is a pattern having an intersection, adjacent point C22 in the vertical direction is seen subsequently from that point. Since such an intersection pattern can be the intersection pattern of initial point C11, the area enclosed by C11, C12, and C22 is set to one cell area (412). Adjacent point C22 in the horizontal direction is seen using C21 as a reference. Since the point includes the intersection, the process advances to the next point C32 in the vertical direction from point C22. However, since the point C32 cannot be the intersection pattern on the diagonal line of the intersection pattern at initial point C21, point C32 is ignored and the process advances to the next point C42 (411). Since C42 can be the intersection pattern for C21, the area enclosed by C21, C22, and C42 is set to one cell area.

Processes have been performed up to the final fourth line in this manner. Therefore, C12 of the second column is used as a reference. No intersection is included in the intersection pattern of adjacent point C13 in the horizontal direction for C12. Therefore, C13 is ignored and the process advances to further adjacent point C14 (409). Since an intersection is included in point C14, adjacent point C24 in the vertical direction is seen from point C14 (409). Since point C24 can be the intersection pattern on the diagonal line of C12, the area enclosed by C12, C14, and C24 is set to a cell area. In a manner similar to the above, the area enclosed by C22, C23, and C33, the area enclosed by C32, C33, and C43, etc. are sequentially designated as cell areas.

What is claimed is:

1. An image processing method comprising the steps of:

inputting image data;

obtaining two histograms in two dimensions of the input image data;

detecting a peak coordinate and a peak width of each of a plurality of peaks in the obtained two histograms, each peak having an extent larger than a threshold predetermined for each histogram;

deciding a plurality of band areas having a width for the respective peak coordinates detected in said detecting step, the width being determined based on an average of the plurality of detected peak widths;

in each of the decided band areas, obtaining a new histogram of the input image data, the new histogram differing in direction from the histogram in which the peak coordinate for the band area was detected in said detecting step;

in each of the decided band areas, determining a coordinate of a specific point from a peak position in the new histogram obtained in the band area and from the peak coordinate for the band area;

selecting two point coordinates among a plurality of specific point coordinates determined in said determining step, the two point coordinates being placed at a distance to each other less than a predetermined threshold; and generating a new specific point coordinate as an intersection of two band areas by obtaining an average of the selected two point coordinates.

2. A method according to claim 1, wherein the image data is inputted by a scanner.

3. An image processing apparatus comprising:

means for inputting image data;

first obtaining means for obtaining two histograms in two dimensions of the input image data;

peak coordinate detecting means for detecting a peak coordinate and a peak width of each of a plurality of peaks in the obtained two histograms, each peak having an extent larger than a threshold predetermined for each;

deciding means for deciding a plurality of band areas having a width for the respective peak coordinates detected by said peak coordinate detecting means, the width being determined based on an average of the plurality of detected peak widths;

second obtaining means for, in each of the decided band areas, obtaining a new histogram of the input image data, the new histogram differing in direction from the histogram in which the peak coordinate for the band area was detected by said peak coordinate detecting means;

point determining means for, in each of the decided band areas, determining a coordinate of a specific point from a peak position in the new histogram obtained in the band area and from the peak coordinate for the band area;

selecting means for selecting two point coordinates among a plurality of specific point coordinates determined in said point determining means, the two point coordinates being placed at a distance to each other less than a predetermined threshold; and generating means for generating a new specific point coordinate as an intersection of two band areas by obtaining an average of the selected two point coordinates.

4. An apparatus according to claim 3, wherein said image processing apparatus has a scanner and the image data is inputted by said scanner.

5. A computer-readable medium storing instructions executable by a program-controlled image processing apparatus, said instructions comprising instructions for:

inputting image data;

obtaining two histograms in two dimensions of the input image data;

detecting a peak coordinate and a peak width of each of a plurality of peaks in the obtained two histograms, each peak having an extent larger than a threshold predetermined for each histogram;

deciding a plurality of band areas having a width for the respective peak coordinates detected in said detecting instruction, the width being determined based on an average of the plurality of detected peak widths;

in each of the decided band areas, obtaining a new histogram of the input image data, the new histogram differing in direction from the histogram in which the peak coordinate for the band area was detected in said detecting instruction;

in each of the decided band areas, determining a coordinate of a specific point from a peak position in the new histogram obtained in the band area and from the peak coordinate for the band area;

selecting two point coordinates among a plurality of specific point coordinates determined in said determining instruction, the two point coordinates being placed at a distance to each other less than a predetermined threshold; and generating a new specific point coordinate as an intersection of two band areas by obtaining an average of the selected two point coordinates.

\* \* \* \* \*

UNITED STATES PATENT AND TRADEMARK OFFICE
CERTIFICATE OF CORRECTION

PATENT NO. : 5,774,584

DATED : June 30, 1998

INVENTOR(S): AKIHIRO MATSUMOTO ET AL.

It is certified that error appears in the above-identified patent and that said Letters Patent is hereby corrected as shown below:

COVER PAGE AT [76] INVENTORS

"Inventors: Akihiro Matsumoto; Toru Niki; Tadanori Nakatsuka; Kazuyuki Saito, all c/o Canon Kabushiki Kaisha, 30-2, 3-chome, Shimomaruko, Ohta-ku, Tokyo, Japan"

should read

--Inventors Akihiro Matsumoto, Kawasaki; Toru Niki, Yokohama; Tadanori Nakatsuka, Kazuyuki Saito, both of Machida, all of Japan--.

COLUMN 3

Line 65, "b,$_{12}$" should read --$b_{12}$--.

COLUMN 4

Line 10, "5" should be deleted;
Line 14, "O<I<L" should read --$O \leq I \leq L$--;
Line 20, "$\approx$0)" should read --$\neq$0)--;
Line 53, "Wb$_3$)" should read --Wb$_3$),--.

UNITED STATES PATENT AND TRADEMARK OFFICE
CERTIFICATE OF CORRECTION

PATENT NO. : 5,774,584

DATED : June 30, 1998

INVENTOR(S): AKIHIRO MATSUMOTO ET AL.

It is certified that error appears in the above-identified patent and that said Letters Patent is hereby corrected as shown below:

COLUMN 6

Line 40, "$(a_{31},$" should read --$(a_3,$--.

Signed and Sealed this

Tenth Day of August, 1999

Attest:

Q. TODD DICKINSON

*Attesting Officer*     *Acting Commissioner of Patents and Trademarks*

UNITED STATES PATENT AND TRADEMARK OFFICE
CERTIFICATE OF CORRECTION

PATENT NO.  : 5,774,584

DATED       : June 30, 1998

INVENTOR(S) : AKIHIRO MATSUMOTO ET AL.

It is certified that error appears in the above-identified patent and that said Letters Patent is hereby corrected as shown below:

On the title page, Item [73],

Insert:   --[73]   Assignee: Canon Kabushiki Kaisha, Tokyo, Japan--.

Signed and Sealed this

Twenty-fourth Day of October, 2000

Attest:

Q. TODD DICKINSON

*Attesting Officer*    *Director of Patents and Trademarks*